Oct. 9, 1934.  E. TURNQUIST  1,976,250
ELECTRIC WELDING MACHINE
Filed Jan. 13, 1930   3 Sheets-Sheet 1

Inventor
Edward Turnquist
By Spencer Hardman & Fehr
His Attorneys

Oct. 9, 1934.　　　　　E. TURNQUIST　　　　　1,976,250
ELECTRIC WELDING MACHINE
Filed Jan. 13, 1930　　　3 Sheets-Sheet 3
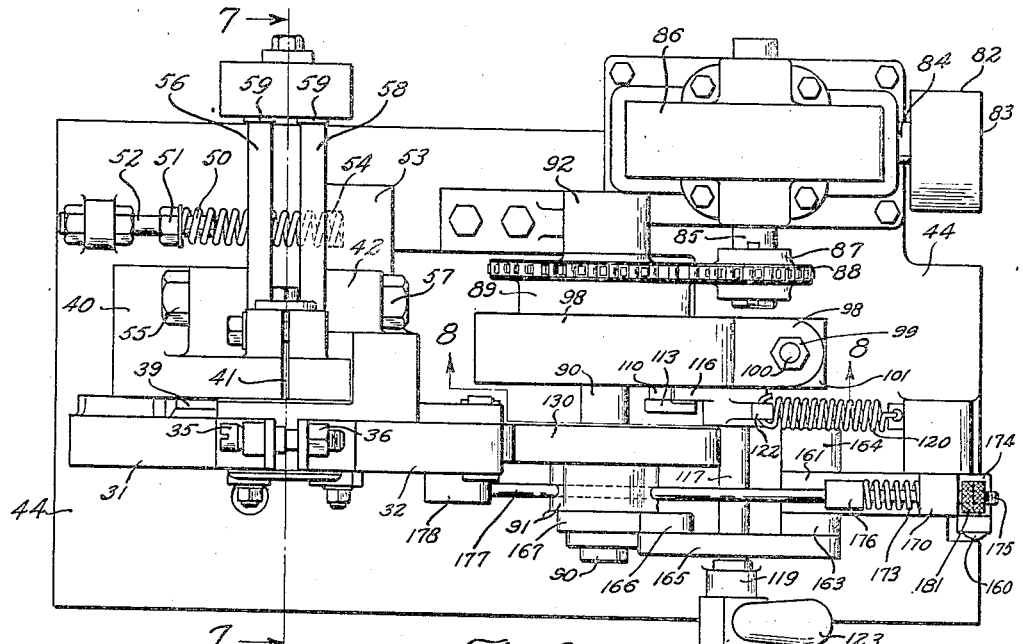

Patented Oct. 9, 1934

1,976,250

UNITED STATES PATENT OFFICE 1,976,250

ELECTRIC WELDING MACHINE

Edward Turnquist, Anderson, Ind., assignor, by mesne assignments, to General Motors Corporation, Detroit, Mich., a corporation of Delaware Application January 13, 1930, Serial No. 420,486

15 Claims. (Cl. 219—4)

This invention relates to apparatus for electrically welding together the abutting ends of a loop or ring of metallic material and more especially for uniting the abutting ends of a single turn of formed relatively thin, sheet metal in order to provide sheet metal articles such as the rims or bezel rings for the door of an automobile lamp.

It is one of the objects of the present invention to provide a machine which is entirely automatic in operation in order to automatically control the pressure maintained between the surfaces to be welded and also the duration of the welding current.

Further objects and advantages of the present invention will be apparent from the following description, reference being had to the accompanying drawings wherein a preferred embodiment of one form of the present invention is clearly shown.

Figure 4:
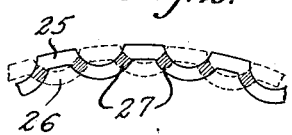

Fig. 4 is a diagrammatic view in which the unbroken line portion shows the contour of one of the edge surfaces to be joined to another edge surface which is represented by broken lines superposed upon that edge surface represented by the unbroken line, and in which the cross-hatched portions represent those portions of the surfaces which are actually engaged at the beginning of the welding operation.

Figure 5:
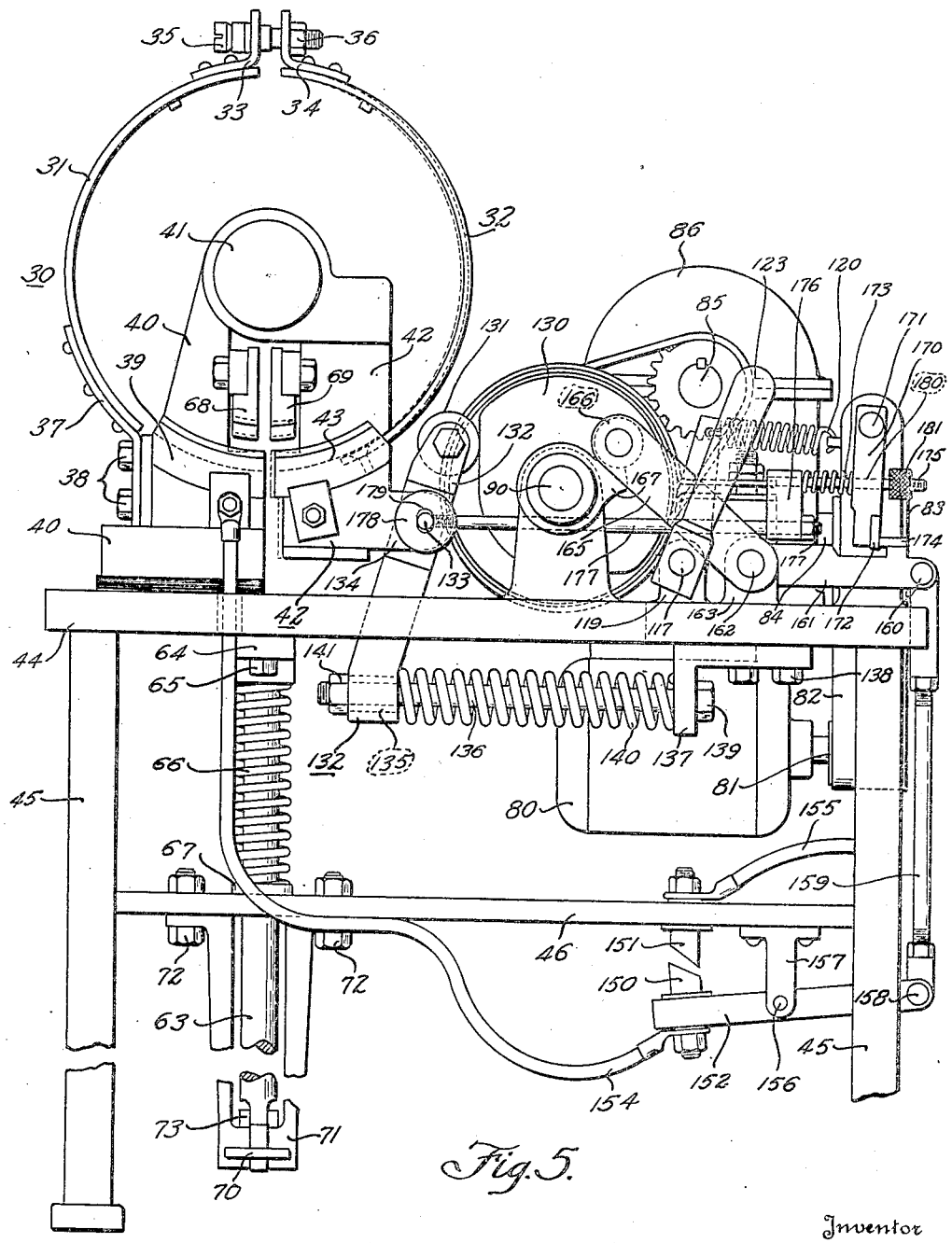

Fig. 5 is a front elevation of the welding machine.

Fig. 6 is a plan view.

Fig. 7 is a sectional view on line 7—7 of Fig. 6.

Fig. 8 is a sectional view on line 8—8 of Fig. 6.

Figs. 9 and 10 are sectional views on lines 9—9 and 10—10 of Fig. 8.

Figure 2:
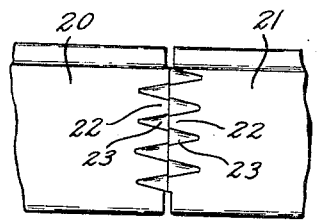
Fig. 2 is a fragmentary view of the abutting ends of a loop of material to be welded.

In order to more clearly understand the welding apparatus embodying the present invention, one of its uses will first be described. In my co-pending application, Serial Number 418,912 filed January 6, 1930 since matured into Patent No. 1,924,220 of August 29, 1933, I have described and claimed a novel method for uniting together by electric welding the abutting ends of turns or loops of material formed from relatively thin sheet metal which in the case of lamp door rims may be formed of sheet brass. My novel method consists briefly in passing a strip of sheet metal between forming rolls which will give it the cross sectional contour required for a lamp door rim or other article which can be made by my process. After the strip leaves the forming rolls it is guided into helical form each turn of which provides sufficient material for forming a rim. The helical coil is divided into lengths of one turn each and the abutting ends are trimmed and shaped as shown in Fig. 2 in which numeral 20 designates one abutting end having a corrugated end portion defined by alternating ridges and valleys 22 and 23 which are in staggered relation with respect to the valleys and ridges of the other end portion 21. That is, the ridges and valleys of the corrugations of part 20 are immediately adjacent the valleys and ridges of the part 21. In Fig. 4 that part of the figure represented by unbroken lines and designated by numeral 25 may be said to represent on a larger scale the end edge surface of the part 20 while that part of the figure designated by numeral 26 and represented by broken lines shows the end surface of the part 21. It will be noted that the cross hatch portions 27 represent the abutting surfaces of the engaging end surfaces. In other words, the end edges of the parts 20 and 21 are in engagement only at the portions 27. This arrangement is advantageous in a welding operation since these portions provide contacts of a relatively higher resistance causing the electrical heating of the material to be localized at these points so that the material is quickly heated to a temperature to cause it to become soft and give way. The parts 20 and 21 being urged toward one another with substantial pressure during the electrical heating thereof, the result is that the valleys and ridges of one part will interlock or dove-tail with the ridges and valleys of the other part so that finally the abutting edges are fused together not only at the portions 27 but also where the ridges of one part overlap with the valleys of another part. By such a process sheet metal such as brass may successfully be welded together because there is a considerable area of contact which has been heated to the fusing point. When using such a process considerable care must be taken not to overheat the work, otherwise the joint may be burned or will be brittle and will easily break apart. In order that this welding method may be successfully practiced the present welding machine has been provided.

Figure 3:
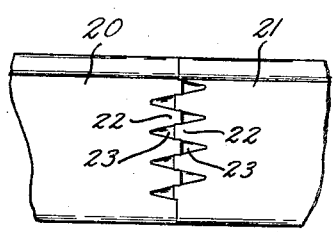
Fig. 3 is a view similar to Fig. 2 showing the two ends welded together.

The welding machine comprises a work holder 30 which includes arcuate clamping members 31 and 32 attached to ears 33 and 34 respectively through which loosely passes a screw 35 receiving a nut 36. The member 31 is riveted to a bracket 37 attached by bolts 38 to a stationary electrode 39 mounted on a frame 40 which carries a pivot stud 41 upon which there is pivotally mounted a bracket 42 to which a movable electrode 43 is attached. Frame 40 and bracket 42 are water cooled by means not shown. The electrodes and the clamping members are shaped so as to receive a loop of rim material designated by numeral 28 and having the end portions 20 and 21 which have been described with reference to Figs. 2, 3 and 4. One of these end portions is shown at 21 in Fig. 7. The frame 40 is insulatingly supported by a table 44 supported by legs 45 which support a shelf 46. The bracket 42 is grounded on the table 44. The electrode 43 is yieldingly urged away from electrode 39 by a spring 50 located between a nut 51 threaded on a stationary rod 52 and a lug 53 integral with the bracket 42 said lug 53 having a spring socket 54. Frame 40 carries a pivot screw 55 providing a bearing for a lever 56, and bracket 42 carries a pivot screw 57 for a lever 58 similar to the lever 56. Levers 56 and 58 are provided with cylindrical end portions 59 received by a groove 60 in a block 61 attached by a screw 62 to an operating rod 63 which passes through a guide bracket 64 attached by screws 65 to the table 44. A spring 66 located between the bracket 64 and a shoulder 67 on the rod 63 tends to move the rod 63 downwardly and hence the levers 56 and 58 into the upper position shown in Figs. 1, 5 and 7. The ends of the levers 56 and 58 adjacent the electrode carry clamps 68 and 69 respectively adapted to be lowered into engagement with the inner surface of the end surfaces 20 and 21 respectively of the rim loop 28 in order to maintain these end portions in good electrical contact with the welding electrodes 39 and 43. The levers carrying the clamps are moved in clockwise direction as viewed in Fig. 7 in order to move the clamps into engagement with the work by moving a pedal 70 downwardly. The pedal 70 is on the front end of a lever of the first order having its intermediate portion pivotally supported by a bracket 71 attached by screws 72 to the shelf 46 and having its rear end 73 pivotally connected with the rod 63 so that the latter moves upwardly against the action of the spring 66 when the pedal 70 is moved downwardly.

Figure 1:
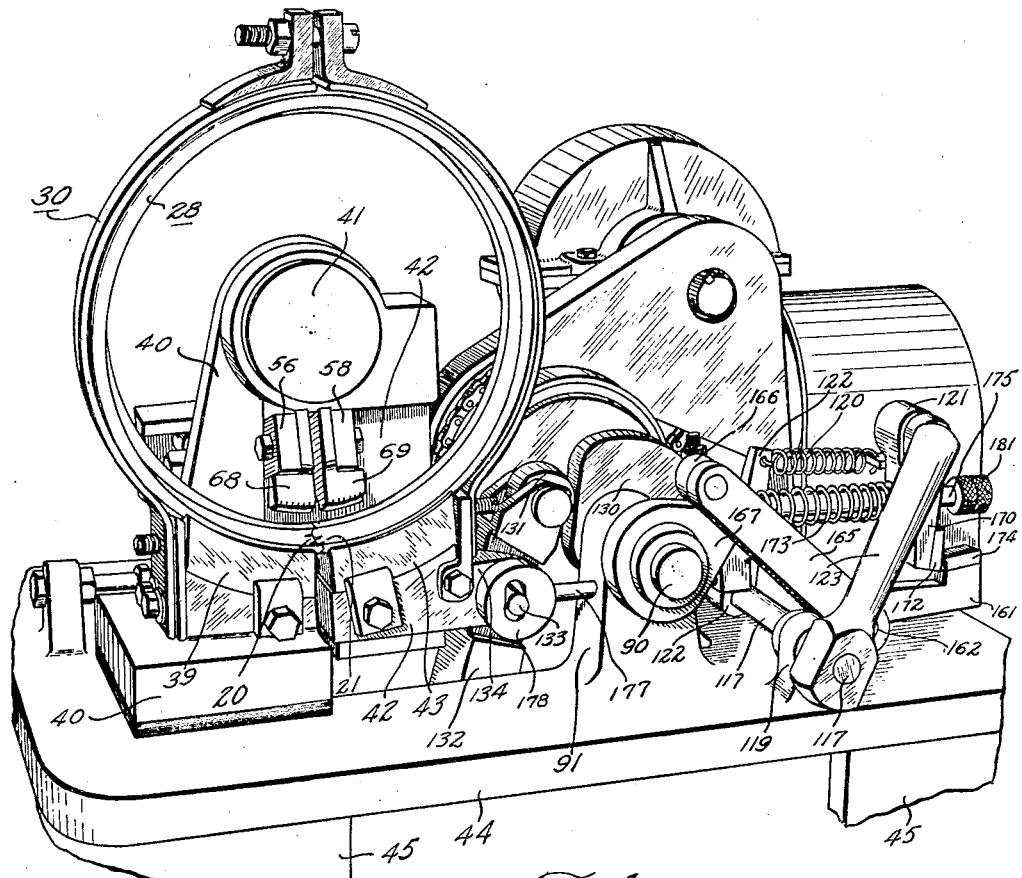
Fig. 1 is a perspective view of a portion of a machine embodying the present invention.

After the work piece 28 has been located within the work holder as shown in Fig. 1 and the pedal 70 has been depressed in order to force the end portions 20 and 21 into good electrical contact with the electrodes, the operation of applying pressure between the ends to be welded and the turning on of the electric current is effected automatically by a mechanism which is set in operation at the will of the operator but which will cease operating automatically in order that the welding will continue only for the proper predetermined time and that the welding pressure will be applied by mechanical means the adjustment of which can be fixed so that uniform results will be obtained. In order to accomplish this an electric motor 80 secured to the underside of the table 44 drives through a suitable pulley 81, belt 82 and pulley 83 a shaft 84 which is connected with a shaft 85 through speed reducing gears contained within a housing 86 also supported by the table 44. The shaft 85 drives a sprocket gear 87 connected by a chain 88 with a sprocket gear 89 which is loosely journalled on a shaft 90 journalled in bearing brackets 91 and 92 which are attached to the table 44. Referring to Fig. 9 a key 93 attaches to the shaft 90 a disc 94 attached by screws 95 to a brake drum 96 cooperating with a brake lining band 97 attached to a clamp band 98. The band 98 may be tightened around the drum 96 by turning a nut 99 threaded on a stud 100 attached to a bracket 101 (see Fig. 8). A light friction is applied to the drum 96 in order to bring the shaft 90 quickly to rest after it has been disconnected from the sprocket 89 by a clutch now to be described.

The clutch for connecting the sprocket 89 with the shaft 90 comprises a clutch pin 110 having an end adapted to be received by a recess 111 provided by the hub of the sprocket 89. The pin 110 extends through a recess 112 in the disc 94 and through a hole aligned therewith in the drum 96 and is provided with a head 113 having a beveled edge 114 adapted to cooperate with the beveled edge 115 of a lever 116 attached to a clutch operating shaft 117 one end of which is supported by the bracket 101 and the other by a bracket 119. Normally, the lever 116 cooperates with the head 113 of the pin 110 to disengage the pin 110 from the sprocket 89 as shown in Figs. 8, 9 and 10. The lever 116 is held in this position by a spring 120 having one end attached to a bearing bracket 121 and the other end attached to a lever 122 also connected with the clutch operating shaft 117. The shaft 117 carries an operating handle 123. By turning the handle 123 counterclockwise as viewed in Fig. 1, the shaft 117 will be moved in the same direction as viewed in Fig. 8 in order to withdraw the lever 116 from the location between the head 113 of the pin 110 and the drum 96 as viewed in Fig. 10. When this occurs a spring 124 located in the recess 112 of the disc 94 between the drum 96 and a shoulder 125 on the pin 110 causes the pin 110 to be urged toward the left, and when the recess 111 comes into alignment with the pin 110 the pin 110 will move into this recess in order to connect the sprocket gear 89 with the disc 94 and hence with the shaft 90. After the shaft 90 starts to rotate in the direction of the arrow 126 in Fig. 8, the lever 123 may be released whereupon the spring 120 will return the lever 116 to normal position so that near the end of one revolution of the shaft 90 the camming surface 114 of the pin head 113 will engage the beveled surface 115 of the lever 116 in order to cause the pin 110 to be withdrawn from the recess 111 of the sprocket gear 89. Therefore, provided the lever 123 is released before the end of one revolution of the shaft 90, the shaft 90 will automatically be disconnected from the sprocket gear 89 and will be quickly stopped by the brake already described.

During one complete revolution of the shaft 90 in a counterclockwise direction as viewed in Figs. 1 and 5, one complete cycle of operation of the welding machine is performed. During this cycle the electrode 43 is yieldingly urged toward the electrode 39. This is effected by a cam 130 fixed to the shaft 90 and cooperating with a roller 131 pivotally supported by a lever 132 and provided intermediate its ends with a pin 133, the ends of which extend beyond the sides of the lever 132, and each end is received by a suitable hole in an arm 134 integral with the electrode bracket 42. The lower end of the lever 132 is provided with a slot 135 through which extends a bolt 136 which also passes through a bracket 137 attached by screws 138 to the table 44, the head 139 of the bolt bearing against the bracket 137 on one side thereof. The other side of the bracket 137 receives one end of a compression spring 140, which surrounds the bolt 136 and bears against the lever 132 urging the same against a nut 141 threaded on the left hand end of the bolt 136. In rotating, the cam 130 will impart to the roller 131 movement which is greater than necessary for moving the end portion 21 of the rim 28 into engagement with the end portion 20 as viewed in Fig. 1. After these end portions have been brought into engagement by the turning of the cam, the cam 130 may cause the lever 132 to rotate in a counterclockwise direction around the pivot pin 133 thereby causing the spring 140 to be further compressed so that this spring may operate to apply a yielding pressure between the parts 20 and 21 of the rim 28.

While the lobe of the cam 130 engages the roller 131 to apply the necessary pressure between the parts to be welded, the welding current is automatically turned on by the automatic closing of switch contacts 150 and 151 insulatingly supported by lever 152 and shelf 46 respectively and connected respectively with wires 154 and 155, the former being connected with the insulated electrode 39 and the latter with a current source having a connection (not shown) with the table 44 to which the other electrode 43 is grounded. Lever 152 is pivoted at 156 upon a bracket 157 attached to the shelf 46 and is pivotally connected at 158 with a link rod 159 pivotally connected at 160 with a lever 161 attached to a shaft 162 journalled in bearing brackets 163 and 164. The shaft 162 is attached to a lever 165 carrying a roller 166 which cooperates with a cam 167 attached to the shaft 90. As the shaft 90 rotates counterclockwise the cam 167 causes levers 165 and 161 to rotate clockwise with the shaft 162, the rod 159 to move downwardly in order to close the switch contact 150 with the contact 151. The contact 150 is automatically locked in engagement with the contact 151 by a latch lever 170 pivotally connected at 171 with the bracket 121 and carrying a wear piece 172 which is urged by a spring 173 against the left hand end of the wear piece 174 carried by the lever 161. The spring 173 surrounds a rod 175 attached at its left hand end to a block 176 which is attached to a rod 177 threadedly connected at its left hand end with a disc 178 having a slot 179 for receiving one end of the pin 133. The rod 175 passes through a plane hole 180 in the lever 170 and is threaded at its right hand end in order to receive nuts 181. When the cam 167 operates to move the lever 161 downwardly in order to move the contact 150 into engagement with the contact 151 the wear piece 174 will be moved down below the lower edge of the wear piece 172; whereupon the spring 173 will operate to move the lever 170 toward the right until it strikes the adjacent nut 181. The movement of the lever 180 will be sufficient to locate the wear piece 172 above the wear piece 174 so that after the lobe of the cam 167 has moved away from the roller 166 the wear piece 174 will be pressed upwardly against the wear piece 172 due to the fact that the lever 152 tends to move counterclockwise on account of the mass of the relatively heavy contact 150. The current will continue to flow until the rod 175 has been moved toward the left sufficiently to cause the nuts 181 to move the lever 170 toward the left until its wear piece 172 clears the wear piece 174 of the lever 161. The rod 175 is moved to the left by the electrode 43 with which it is connected by block 176 and rod 177 and slotted disc 178 and pin 133. The electrode 43 moves toward the electrode 39 as the metal at the contacting edges of rim parts 20 and 21 softens to permit movement of the part 21 relative to the part 20. When this movement has taken place to a certain extent the lever 170 will have been moved sufficiently to cause its wear piece 172 to move away from the top surface of the wear piece 174 whereupon the switch contact 150 will be permitted to drop by gravity. It is therefore apparent that the duration of flow of welding current is adjusted by the setting of the nuts 181 so that welding current will be applied only long enough to soften the metal so that a predetermined amount of displacement or interlocking of one end part of the rim 28 into the other end part. In other words, the welding current is discontinued at the instant the metal has been softened sufficiently so that a certain amount of movement of one rim part into the other rim part has taken place.

The welding apparatus embodying the present invention is entirely automatic in operation since it automatically controls the length of time during which pressure is applied to the surfaces to be welded together and the duration of the welding current which passes between them. All that is required of the operator is to place the work within the work holder 30 as shown in Fig. 1 and move the handle 123 counter-clockwise until the clutch is released whereupon the handle may be released and the machine continues to operate until the welding has been completed and then the machine stops with the welding current turned off. By using such a machine too, liability of spoiling parts by overheating has been reduced to the minimum. The machine having been adjusted for a certain kind of work, the product of the machine will be substantially uniform for an indefinite period and no further adjustments are required.

While the form of embodiment of the present invention as herein disclosed, constitutes a preferred form, it is to be understood that other forms might be adopted, all coming within the scope of the claims which follow.

What is claimed is as follows:

1. Electric welding apparatus comprising, in combination, a pair of electrodes, means for clamping parts to be welded to said electrodes, means for moving one electrode toward the other, a cam shaft; a cam on said shaft for actuating the electrode moving means; a normally open switch in series with a circuit including the electrodes, means operated by another cam on said shaft for closing said switch, a latch for holding said switch closed, and means operated by the movable electrode for tripping said latch.

2. Electric welding apparatus comprising, in combination, a pair of electrodes, means for clamping parts to be welded to said electrodes, power operated means for yieldingly urging one electrode toward the other, and means for automatically separating said one electrode from the other electrode in response to a predetermined movement of said one electrode toward the other.

3. Electric welding apparatus comprising, in combination, a pair of electrodes, one being stationary, the other movable relative thereto; yielding means normally urging the movable electrode away from the stationary electrode; means for clamping parts to be welded to said electrodes; means including a single spring for yieldingly maintaining the movable electrode in a predetermined retracted position relative to the other electrode; a rotary cam for acting upon the last said means so as to compress said spring, thereby yieldingly to urge the movable electrode toward the other electrode, and to control movement of said movable electrode away from the other electrode; power means for rotating the cam; power operated means completing a circuit to said electrodes; means for interrupting the electrode circuit automatically after a predetermined interval; means for stopping operation of the power operated means after the completion of one cycle of movement thereof; manually operable means for drivingly connecting the power means with the cam; and means for disconnecting the cam from the power means.

4. Electric welding apparatus comprising, in combination, a pair of electrodes, one being movable and the other stationary; yielding means normally urging the movable electrode away from the stationary electrode, means for clamping parts to be welded to said electrodes, a lever pivoted intermediate its ends to the movable electrode; a rotary cam for moving the movable electrode toward the stationary electrode; a cam roller carried by one end of said lever and engaging the rotary cam; a spring bearing against the other end of said lever, said spring being compressed in most retracted position of the movable electrode and thereby urging the cam roller into engagement with the cam, said spring being even further compressed by the movement of the movable electrode toward the other electrode as governed by the rotating cam and means for rotating the cam.

5. Electric welding apparatus comprising, in combination, a pair of electrodes; means for clamping parts to be welded to said electrodes; a single spring yieldingly maintaining one of the electrodes in a predetermined position relative to the other electrode; a rotary cam for compressing said spring, thereby yieldingly urging said one electrode toward the other electrode and for controlling movement of said one electrode away from the other; power means for rotating the cam; a normally open switch in series with a circuit including the electrodes; a cam rotatable with the first said cam for closing the switch; a latch engaging and holding the switch in closed position in response to movement of the movable switch part into closing position; means for disengaging the latch from the switch in response to a predetermined movement of said one electrode toward the other electrode; manually operable means for drivingly connecting the power means with the first said cam; and means for interrupting the last said driving connection.

6. Electric welding apparatus comprising, in combination, a pair of electrodes; means for clamping parts to be welded to said electrodes; a single spring yieldingly maintaining one of the electrodes in a predetermined position relative to the other electrode; a rotary cam for compressing said spring, thereby yieldingly urging said one electrode toward the other electrode and for controlling movement of said one electrode away from the other; a prime mover; a one revolution clutch for drivingly connecting the prime mover with the cam; a normally open switch in series with a circuit including the electrodes; a cam rotatable with the first said cam for closing the switch; a latch engaging and holding the switch in closed position in response to movement of the movable switch past into closing position; means for disengaging the latch from the switch in response to a predetermined movement of said one electrode toward the other electrode; and manually operable means for drivingly engaging the one revolution clutch.

7. Apparatus for welding together the ends of an open ring comprising, in combination, a pair of relatively movable electrodes; yieldable means carried by the electrodes for supporting a ring to be welded in a predetermined position relative to said electrodes; manually operable means for urging the ends of a supported ring into engagement with the electrodes; and means for moving one electrode relative to the other electrode thereby contracting the ring supporting means whereby the ring is contracted and the ends thereof moved relative to each other.

8. Apparatus for welding together the ends of an open ring comprising, in combination, a pair of relatively movable electrodes; yieldable means carried by the electrodes for supporting a ring to be welded in a predetermined position relative to said electrodes; manually operable means for urging the ends of a supported ring into engagement with the electrodes; and means for moving one electrode toward the other electrode thereby contracting the ring supporting means whereby the ring is contracted and the ends thereof moved relative to each other.

9. Apparatus for welding together the ends of an open ring comprising, in combination, a pair of relatively movable electrodes; means for supporting a ring to be welded in a predetermined position relative to the electrodes, said means comprising an arcuate band engaging the periphery of a ring and being pivotally mounted with one end on one electrode and attached with the other end to the other electrode; and means for moving one electrode relative to the other electrode, thereby rotating the band about its pivot support whereby the ring is contracted and the ends thereof moved relative to each other.

10. Apparatus for welding together the ends of an open ring comprising, in combination, a pair of relatively movable electrodes; means for supporting a ring to be welded in a predetermined position relative to the electrodes, said means comprising two arcuate bands engaging the periphery of a ring and having adjacent ends pivotally connected with each other and the other ends attached to the electrodes, and projecting lugs on the bands for maintaining the same in alignment with the periphery of the supported ring; manually operable means for urging the ends of a supported ring into engagement with the electrodes; and means for moving one electrode relative to the other electrode, thereby rotating one band about the pivot connection between both bands, whereby the ring is contracted and the ends thereof moved relative to each other.

11. Apparatus for welding together the ends of an open ring comprising, in combination, a pair of relatively movable electrodes; means for supporting a ring to be welded in a predetermined position relative to the electrodes, said means comprising two arcuate bands engaging the periphery of a ring and having adjacent ends pivotally connected with each other and the other ends attached to the electrodes, and projecting lugs on the bands for maintaining the same in alignment with the periphery of the supported ring; manually operable means for urging the ends of a supported ring into engagement with the electrodes; and means for moving one electrode toward the other electrode thereby rotating one band about the pivot connection between both bands whereby the ring is contracted and the ends thereof moved toward each other.

12. Electric welding apparatus comprising, in combination, a pair of electrodes; means for clamping parts to be welded to said electrodes; means for moving one electrode toward the other electrode; a normally open switch in series with a circuit including the electrodes; means actuated in timed relationship with the operation of the electrode moving means for closing the switch; a latch for holding said switch closed; and means actuated in response to a predetermined movement of said one electrode toward the other electrode for tripping said latch.

13. Electric welding apparatus comprising, in combination, a pair of electrodes; means for clamping parts to be welded to said electrodes; means for moving one electrode toward the other electrode; a normally open switch in series with a circuit including the electrodes; means actuated in timed relationship with the operation of the electrode moving means for closing the switch; a latch for holding said switch closed; and means operated by the movable electrode for tripping said latch.

14. Electric welding apparatus comprising, in combination, a pair of electrodes; means for clamping parts to be welded to said electrodes; means for moving one electrode toward the other electrode; a rotatable cam for actuating the electrode moving means; a normally open switch in series with a circuit including the electrodes; means actuated in timed relationship with the rotation of the cam for closing the switch; a latch for holding said switch closed; and means actuated in response to a predetermined movement of said one electrode toward the other electrode for tripping said latch.

15. Electric welding apparatus comprising, in combination, a pair of electrodes; means for clamping parts to be welded to said electrodes; power operated means for yieldingly urging one electrode toward the other; means actuated in timed relationship with the operation of the power operated means for completing a circuit to said electrodes; means for automatically separating said one electrode from the other electrode in response to a predetermined movement of said one electrode toward the other; and means for interrupting the electrode circuit in response to a predetermined movement of said one electrode toward the other electrode.

EDWARD TURNQUIST.